United States Patent [19]

Davis

[11] 3,928,237

[45] Dec. 23, 1975

[54] METHOD OF CATALYST PREPARATION FOR USE IN SUPPRESSING HYDROCARBON AND CARBON MONOXIDE EMISSION FROM INTERNAL COMBUSTION ENGINES

[76] Inventor: Robert E. Davis, 125 Hillcrest, Hinsdale, Ill. 60521

[22] Filed: Aug. 20, 1973

[21] Appl. No.: 389,963

Related U.S. Application Data

[63] Continuation-in-part of Ser. No. 307,652, Nov. 17, 1972, abandoned.

[52] U.S. Cl............ 252/465; 252/466 PT; 252/470; 252/472
[51] Int. Cl.² ........................................ B01J 23/16
[58] Field of Search....... 252/465, 466 PT, 470, 472

[56] References Cited
UNITED STATES PATENTS

| | | | |
|---|---|---|---|
| 2,760,940 | 8/1956 | Schwarzenbek | 252/466 PT |
| 2,780,603 | 2/1957 | Burton | 252/466 PT |
| 2,895,905 | 7/1959 | Kimberlin | 252/466 PT X |
| 3,218,268 | 11/1965 | Arnold | 252/465 |
| 3,272,760 | 9/1966 | Doelp | 252/465 |
| 3,291,564 | 12/1966 | Kearby | 252/465 X |
| 3,295,918 | 1/1967 | Briggs et al. | 252/466 PT X |
| 3,455,843 | 7/1969 | Briggs et al. | 252/465 X |
| 3,755,534 | 8/1973 | Graham | 423/213.7 |
| 3,787,333 | 1/1974 | Ichihara et al. | 252/465 |

*Primary Examiner*—Paul F. Shaver

[57] ABSTRACT

A method of lowering undesirable vehicle exhaust emissions includes preparing a catalyst for use in the exhaust stream of the vehicle. The method includes preparing a solution of an ammonia metal complex, applying the complex to an alumina substrate, heating the substrate to remove water and ammonia, and converting the metal to its active form. Additional metals may be complexed in a similar manner and deposited on separate substrates and the separate substrates may then be mixed to achieve any desired proportion of the metal catalysts.

15 Claims, No Drawings

METHOD OF CATALYST PREPARATION FOR USE IN SUPPRESSING HYDROCARBON AND CARBON MONOXIDE EMISSION FROM INTERNAL COMBUSTION ENGINES

RELATED APPLICATION

This is a continuation-in-part application of my copending application for "Method Of Catalyst Preparation For Use In Suppressing Hydrocarbon And Carbon Monoxide Emission From Internal Combustion Engines," Ser. No. 307,652, filed Nov. 17, 1972 now abandoned.

BACKGROUND AND SUMMARY OF THE INVENTION

Although many investigations have been made into the feasibility of reducing hydrocarbon and carbon monoxide emission from automobile exhausts, particularly through the use of catalysts, none has been consistently successful. In particular, none have consistently met the E.P.A. (Environmental Protection Agency) requirements. These requirement define the permissible limits of CO and HC fumes; and they specify the time duration during which such limits must be met without replacement of the catalyst.

In this connection, chromium has been recognized as an oxidation catalyst and has been tried in many forms and combinations but without sustained success. Through the use of a novel processing of this ion and augmenting the same with other metal ions, I have been able to provide a successful catalyst for the oxidative conversion of hydrocarbons (HC) and carbon monoxide (CO) to harmless gases, viz., carbon dioxide and water. Other metals which have been successfully employed in the practice of the invention include platinum and palladium.

An important feature of the inventive method is the use of ammonia to develop a complex with the metallic ion or ions. This, in solution form, is applied to the substrate which normally is alumina, but which may take other forms such as silica, alumina-silica, carbon, and firebrick. Although the mechanism by which the invention operates is imperfectly understood, it is believed that the ammonia ligands in the metalloammonium complex bridge certain active sites on the alumina substrate in a temporary fashion, making these available subsequently for residence by the metal ions. The use of ammonia is advantageous also in preventing the development of nitrogen oxides, which may be the case if nitrates were used.

In addition, the invention enables one to deposit different catalysts on separate substrates by treating the substrates (which may be provided in pellet form) with different complexed metals. I have discovered that significantly improved results may be obtained by thus separating the catalysts, and catalytic systems may easily be provided in a desired proportion of different catalysts with each individual catalyst being provided in optimum amounts.

Through the practice of the inventive method I have provided catalyst systems which achieve significantly superior conversion of the noxious exhaust gases into innocuous gases.

Specific examples of the invention are set forth below as illustrative.

EXAMPLE I 390 grams of ammonium dichromate was dissolved in 3.5 liters of distilled water. In the practice of the invention, distilled water is preferred to insure the substantial absence of iron or foreign metals which can be deleterious to catalysts. Thereafter, ammonium hydroxide was added in sufficient quantity to the ammonium dichromate solution to form a chromium-ammonia complex. In a separate stirring container, 253 milliliters of palladium chloride solution was placed, the concentration of the palladium in the palladium chloride was 1.2 grams/liter. Thereafter, the chromium-ammonia complex was added to the container equipped with a stirrer, after which 4000 grams of alumina pellets (manufactured by Reynolds Metals Co.) were added. Agitation was continued until the liquid was completely absorbed, this usually being a matter of minutes. Following this, the pellets were dried to drive off ammonia and water. Normally this takes about 10 minutes at a temperature of about 550° F. Thereafter the pellets were subjected to further heat of the order of 750°–1,000° F. to convert the metals to the respective oxides. Normally, this takes 20 to 25 minutes.

Using the pellets thus treated as a catalyst in a standard General Motors test engine on the E.P.A. cycle, it was found that hydrocarbon emission was reduced from 2.38 grams per mile to 0.10 grams per mile, and the carbon monoxide emission from about 24 grams per mile to 1.18 grams per mile.

EXAMPLE II

The same procedure was followed except that in place of the alumina pellets, a monolithic cylinder of alumina was employed as the substrate. Such a monolithic substrate is available from American Lava Co. which, like the pellets of Example I, were a gamma alumina with small amounts of alpha alumina and silica. In the case of using the monolith cylinder of alumina, the corrugation-like interstices are first washed with alumina gel such as is available from Filtrol Corp. or Nalco Chemical Company. This is achieved by immersing the monolithic cylinder in a solution of alumina gel, draining the cylinder, and drying at 300°–400° F. to drive off all moisture and the acids which form the gel. With the formulation of the chromium-ammonia complex and palladium as specified in Example I and applied in the same procedure, like satisfactory results were obtained.

EXAMPLE III

The procedure of Example I was followed with the further preparation of a solution of cobalt acetate employing approximately 100 grams per liter. The cobalt acetate solution was converted to the cobalt-ammonium complex through the addition of approximately 250 milliliters of ammonium hydroxide. Both the cobalt-ammonium complex and the separately formed chromium-ammonium complex were added substantially simultaneously to the larger vessel containing the palladium chloride solution after which the alumina pellets were added for uptake of the metallic ions. If the complexes are produced together, a reaction occurs, resulting in precipitation. With the catalyst having the three metallic elements, viz., cobalt, chromium, and palladium, like satisfactory results were obtained upon engine testing.

EXAMPLE IV

The procedure of Example III was followed with the exception that copper acetate was substituted for the cobalt acetate to provide the second metallo complex solution. Satisfactory results were obtained insofar as the depression of the hydrocarbon emission and carbon monoxide emission are concerned, but the copper is more sensitive to sulphur. The formulations of the first three examples were not sensitive to contamination by minor amounts of sulphur, phosphorus, or lead.

EXAMPLE V

The procedure of Example IV was followed except that, in addition, a third metallo complex was prepared — this being the cobalt-ammonium complex described in Example III. Thus, there was provided a catalyst which had cobalt, chromium, copper and palladium on the alumina.

EXAMPLE VI

In this example, 2 grams of platinum metal were dissolved per liter of aqua regia, thereby forming platinum chloride which is soluble in water. Thereafter, ammonium hydroxide was added in sufficient amount to form a platinum-ammonia complex. The formation of a complex is noted as the color of the solution changes—in this case from an orange to a yellow. Thereafter, the solution was added to a quantity of the alumina pellets, as described above, and the mixture was agitated. The pellets are then treated as described in Example I by drying it at a temperature in the range 750° F. to 1000° F. for a period of 20 to 25 minutes.

I have found that by using enough platinum so that the finished pellets are 0.1% platinum by weight, the best catalyst is provided because conversion activity does not increase significantly with more platinum. The pellets range in density from 30 to 36 pounds per cubic foot, and adjustments in the amount of platinum are made accordingly.

In a separate stirring container, palladium chloride was placed in solution, as described in Example I; and thereafter, ammonium hydroxide was added to this solution to form a palladium-ammonium complex. Alumina pellets were then added to the container, and, under agitation, the complex was absorbed by the pellets. After heat treatment as described in connection with the above examples, the pellets with complexed palladium may be mixed in any desired ratio with those pellets containing the complexed platinum. For example, one automobile manufacturer desired a catalyst having a nominal 5 to 2 ratio of platinum to palladium. By complexing the platinum and palladium and providing them on separate pellet substrates, the desired ratio of platinum to palladium was obtained, and the resultant catalyst system was 50 per cent better in the reduction of hydrocarbons and carbon monoxide in automobile emission than had heretofore been obtained when platinum and palladium were provided on a common substrate according to conventional techniques. In this example, palladium comprised 0.045% of the palladium-coated pellets, by weight. A catalyst system constructed according to this example sustained catalytic activity sufficient to meet the EPA requirements.

I have found that when platinum is used as a catalyst and prepared in the manner described herein, better results in the reduction of noxious emission may sometimes be obtained when a separate metal is also used if the platinum and the other metal are provided on different substrates as described in this example. Again, the phenomenon involved is not perfectly understood; and without intending to limit the invention, it is postulated that the ultimate results depend to some extent on the magnitude and polarity of the electropotential of the element as measured in my copending application for "Apparatus and Method for Measuring Conversion Efficiency of Catalysts," Ser. No. 376,371, filed July 5, 1973, which is expressly incorporated herein by reference. For example, if these potentials are of an opposite polarity, it appears that the resultant catalytic effect is diminished when the metals are deposited on the same substrate and in any way chemically bound together or in physical contact with each other. In any case, in the case of platinum/palladium, the improved results noted above occur only when the platinum, after complexing, is deposited on one group of pellets and the complexed palladium is deposited on a second group of pellets. The pellets may then be mixed in any desired ratio and for the same ratio of platinum to palladium, the uniformly but separately coated pellets provide a significant improvement.

EXAMPLE VII

In this example, the separate pellets of complexed platinum and complexed palladium are prepared as in Example VI; however, a trace of chromium is added to the palladium and complexed. That is, less than about 0.1% by weight of chromium is added to the platinum solution. This appears to form smaller particles of the deposited metal and thereby increases the active surface and activity of the catalyst. This catalyst system reduced the amount of emission to about one-fifth that which had been present when platinum alone is used as a catalyst—that is, with equal amounts of platinum in each catalyst system for comparative purposes. Again, platinum comprised about 0.1% by weight of the final pellets.

EXAMPLE VIII

In this example a group of pellets were prepared with complexed platinum (to which a trace of complexed chromium had been added). The final pellets contained 0.1% platinum by weight. To obtain equivalent conversion efficiency using the prior art pure platinum catalyst, one would have to use five times the amount of platinum.

EXAMPLE IX

In this example, a group of pellets was prepared with complexed platinum alone, again having a 0.1 per cent platinum by weight. Test results indicate that a catalyst with the complexed platinum constructed according to my invention will reduce the unconverted hydrocarbons in exhaust emission by 50% when compared with the prior art pure platinum catalyst having an equal amount of platinum. Still further improved results may be obtained by dissolving a trace of chromium in the solution and complexing and depositing it along with the platinum.

I claim:

1. A method of preparing a catalyst on a substrate for use in suppressing hydrocarbon and carbon monoxide emission from internal combustion engines comprising taking a solution containing dissolved platinum, complexing the platinum by adding ammonia to the solution, contacting an amount of substrate with the solution so that the substrate absorbs the solution, and heating the substrate to remove ammonia and water to provide a catalyst, the amount of substrate added to the solution being such that the weight of platinum in the solution is about 0.1% of the weight of the catalyst.

2. The method of claim 1 in which the substrate is heated at a temperature of less than 1,000° F.

3. The method of claim 2 in which the substrate is heated for about 20 to 25 minutes.

4. The method of claim 2 in which the substrate is first heated at a temperature of about 550° F. and is then heated at a temperature of about 750° F. to 1,000° F.

5. The method of claim 2 including the step of dissolving chromium in the solution prior to the contacting step, the amount of chromium being less than about 0.1% by weight of the catalyst.

6. A method of preparing a catalyst for use in suppressing hydrocarbon and carbon monoxide emission from internal combustion engines comprising
   a. taking a solution containing dissolved platinum, complexing the platinum-containing solution by adding ammonia to the solution, contacting a first substrate with the platinum-containing solution so that the first substrate absorbs platinum, and heating the platinum-containing first substrate to remove ammonia and water,
   b. taking a solution containing dissolved palladium, complexing the palladium-containing solution by adding ammonia to the solution, contacting a second substrate with the palladium-containing solution so that the second substrate absorbs palladium, and heating the palladium-containing second substrate to remove ammonia and water,
   c. placing the platinum-containing first substrate and the palladium-containing second substrate in the path of an exhaust stream of an internal combustion engine.

7. The method of claim 6 in which the weight of platinum absorbed by the first substrate is about 0.1% of the weight of the platinum-containing first substrate after the heating step.

8. The method of claim 6 in which the heating of both the first and second substrates is carried out at a temperature of less than 1,000° F.

9. The method of claim 6 in which the first substrate comprises a first group of pellets and the second substrate comprises a second group of pellets, the method including the step of mixing the platinum-containing first group of pellets and the palladium-containing second group of pellets before the pellets are placed in the exhaust stream.

10. The method of claim 9 in which the weight of platinum absorbed by the first group of pellets is about 0.1% of the weight of the platinum-containing first group of pellets after the heating step.

11. The method of claim 9 in which the weight of platinum absorbed by the first group of pellets is about 0.1% of the weight of the platinum-containing first group of pellets after the heating step, the heating of both the first and second groups of pellets being carried out at a temperature of less than 1000° F.

12. The method of claim 6 including the step of dissolving chromium in one of the solutions prior to the step of contacting substrate with the solution, the weight of chromium being less than about 0.1% of the weight of the substrate contacted with said one solution after the heating step.

13. A catalyst for reducing hydrocarbon and carbon monoxide emission from internal combustion engines comprising a plurality of pellets, some of the pellets containing platinum but not palladium and some of the pellets containing palladium but not platinum, the platinum-containing pellets and the palladium-containing pellets being mixed together.

14. The catalyst of claim 13 in which the total weight of platinum contained by the platinum-containing pellets is about 0.1% of the total weight of the platinum-containing pellets.

15. The catalyst of claim 13 in which the pellets are made of alumina.

* * * * *